United States Patent
Kemp

[11] Patent Number: 5,127,628
[45] Date of Patent: Jul. 7, 1992

[54] MEANS FOR ROTATING BALL VALVES BETWEEN OPEN AND CLOSED POSITIONS

[75] Inventor: Willard E. Kemp, Houston, Tex.

[73] Assignee: Fike Corporation

[21] Appl. No.: 787,236

[22] Filed: Nov. 4, 1991

[51] Int. Cl.⁵ .............................................. F16K 5/06
[52] U.S. Cl. ................................. 251/315; 251/304
[58] Field of Search ............................... 251/304, 315

[56] References Cited
U.S. PATENT DOCUMENTS
3,006,602 10/1961 Usob ..................................... 251/315
3,598,363 8/1971 Shaw ................................ 251/315 X Primary Examiner—John C. Fox
Attorney, Agent, or Firm—Dodge, Bush, Moseley & Riddle

[57] ABSTRACT

A ball valve (10) has a stem (28) to rotate a ball member (20) with a lower key or lug (29) received within a slot or opening (26) forming a keyway in the ball member (20). As shown particularly in FIGS. 2 and 3, relieved or cutaway surfaces (52, 54, 56) are provided between lug (29) and the outer spherical surface (24) of ball member (20) so that a torque exerted by rotation of the stem (28) contacts surfaces (34, 36) of the slot (26) along opposed corners (48) which are spaced a distance T1 from the outer spherical surface (24) of ball valve member (20) thereby removing or minimizing any stress concentrations adjacent outer spherical surface (24).

6 Claims, 3 Drawing Sheets

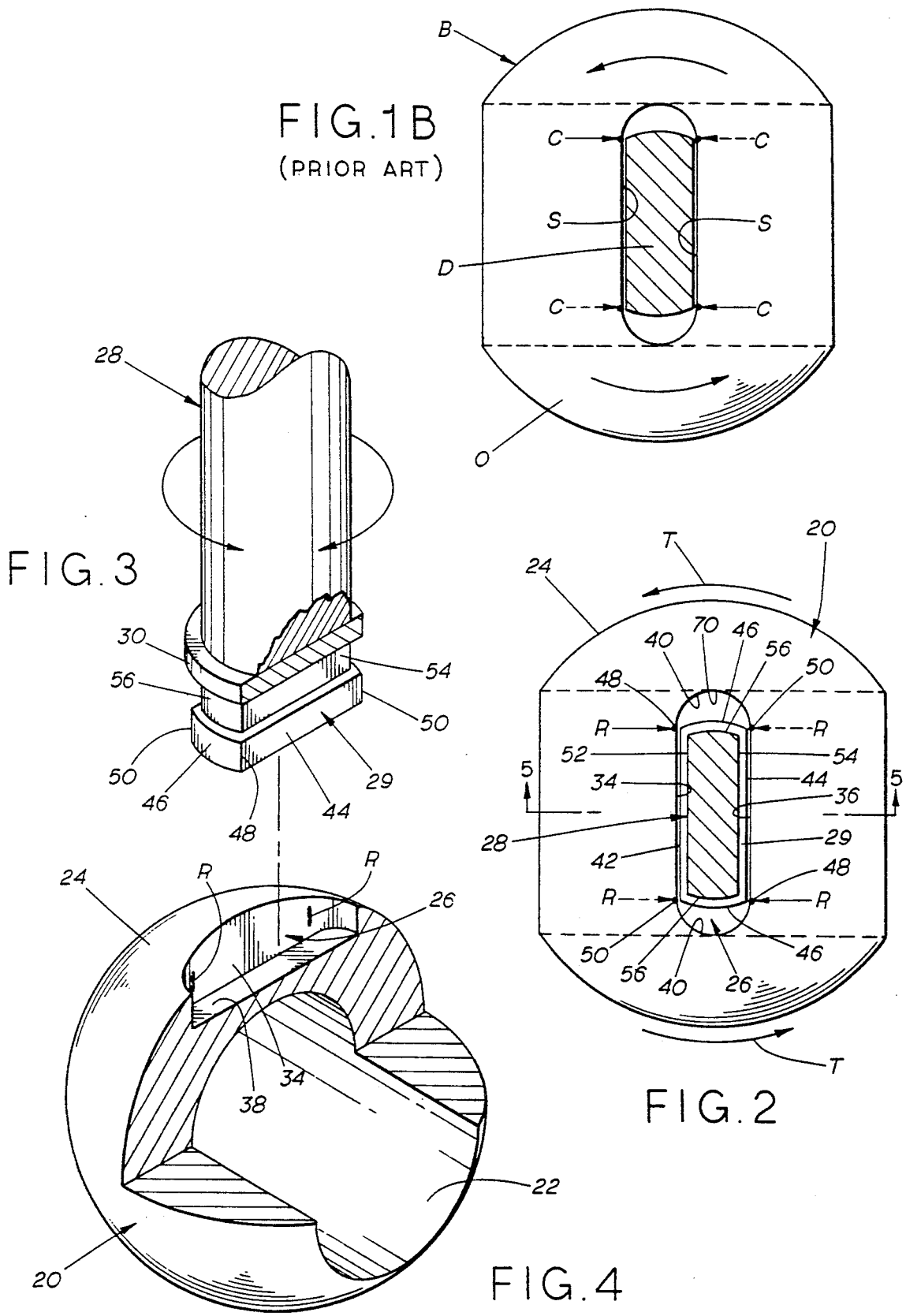

MEANS FOR ROTATING BALL VALVES BETWEEN OPEN AND CLOSED POSITIONS

FIELD OF THE INVENTION

This invention relates generally to means for rotating ball valves between open and closed positions and more particularly to such means including a drive stem engaging a ball valve member for rotating the ball valve between open and closed positions.

BACKGROUND OF THE INVENTION

Ball valves or ball structures have a valve ball member which is separate from the stem. Stress arises between the stem and ball valve member when the stem is rotated and in turn contacts the ball valve member for rotating the ball valve member against possible high resistance from fluid pressure acting against the ball valve member or from as stop against the ball valve member instead of the stem.

In so-called floating type ball valves in which the ball valve member is not mounted on a fixed bearing for rotation, an elongate slot is normally formed in the ball valve member to receive a lug or key on the inner end of the stem for rotation of the ball valve member. Normally during rotation of the ball member a high stress concentration is obtained at opposite corners of the stem lug against the adjacent flat surfaces or planar of the slot or spline formed in the ball valve member. Under certain high stress conditions and with the ball member made of certain materials, such as ceramics, the ball member may fracture or crack adjacent the slot, and particularly adjacent the outer surface of the ball member at high stress concentrations Ceramic materials are very strong but suddenly fracture or crack once their strength level is exceeded as ceramic does not have a yield point. Ceramics are very rigid with a modulus of elasticity around 30 to 60 million pounds per square inch (psi) as compared with most metal stem materials which have a modulus of elasticity between 14 and 29 million psi. When a stem is engaged to a ball with uniform cross-section throughout its engagement and then a torsional load is applied to the stem, the stem because of its lower modulus of elasticity and smaller cross-section will distort to a greater degree than the ball. This causes the load trasfer point to move higher on the stem. Under extreme conditions, the load is almost entirely carried near the outer periphery of the ball, that is at the point where the stem first engages the ball. In metal ball valves, the material at the outer edge of the ball will eventually yield slightly so that the stem stresses are redistributed more uniformly along the length of the stem to ball engagement. With ceramic balls this doesn't happen. If the ceramic material reaches its breaking strength it simply fractures.

SUMMARY OF THE PRESENT INVENTION

The present invention is particularly directed to a ball valve structure in which the inner end of a drive stem fits within a slot of the ball member and has a lug or key on its inner end for contacting the adjacent flat surfaces defined by the slot along areas spaced from the outer surface of the ball member thereby to minimize cracking or fracture of the ball member at the stem connection. High stress concentrations are reached during rotation of the ball member by the stem along contact areas of the stem with the ball member and by spacing the areas of the ball member contacted by the stem from the adjacent outer spherical surface of the ball member an increased volume of the ball member is provided to distribute the stress concentrations from the stem thereby to minimize fracture of the ball member.

Oftentimes, ball members are formed of a ceramic material which are very rigid or brittle with a modulus of elasticity between 30 to 60 million psi and fractures oftentimes occurr from stress concentrations exerted by the stem against the ball member, particularly with small diameter ball members having a bore between ½ inch and 2 inches in diameter, for example. The present invention relieves the end of the drive stem received within the slot of the ball member so that all of the contact between the stem and the ball member is deeper in the slot and spaced from the outer spherical surface of the ball member at least around 1/16 inch so that stress concentrations resulting from such contact is easily distributed by the ball member within any cracking or fracturing occurring adjacent the slot. Testing has also indicated that the stress concentrations are substantially reduced so that the ball members have a substantially increased torsional capability. Finite element analysis has confirmed the large stress concentrations adjacent the outer spherical surface of the ball member resulting from contact of the stem thereat and the substantially reduced stress concentration when contact of the stem with the surfaces of the slot is spaced from the outer spherical surface of the ball member in accordance with the present invention. The present invention may be utilized with a drive stem for both floating members and trunnion mounted ball members.

It is an object of this invention to provide a ball valve which minimizes cracking or fracture of the ball member resulting from rotation of the ball member by a stem.

It is a further object of this invention to provide a drive stem for a ball valve which minimizes stress concentrations resulting from contact of a ceramic ball member by the stem during rotation of the ball member by the stem.

An additional object of this invention is the provision of a ball valve in which the torsional capability of the ball member is substantially increased.

Other objects, features, and advantages of this invention will become more apparent after referring to the following specification and drawings.

BRIEF DESCRIPTION OF THE DRAWINGS

FIG. 1B is a further view of the prior art ball valve of FIG. 1A taken generally along line 1B—1B of FIG. 1A and showing the high stress concentrations at the outer spherical surface of the ball member resulting from stem contacting areas thereat;

FIG. 2 is a sectional view taken generally along line 2—2 of FIG. 1 and showing the relieved or reduced thickness of the inner end of the stem received within the slot of the ball member with the enlarged thickness inner end in the deep portion of the slot;

FIG. 3 is a perspective of the inner end portion of the drive stem showing the relieved thickness portion of the end portion;

FIG. 4 is a perspective of a portion of the slot in the ball member and showing the contact areas of the stem spaced from the outer spherical surface of the ball member.

DESCRIPTION OF THE PRIOR ART

Figure 1:
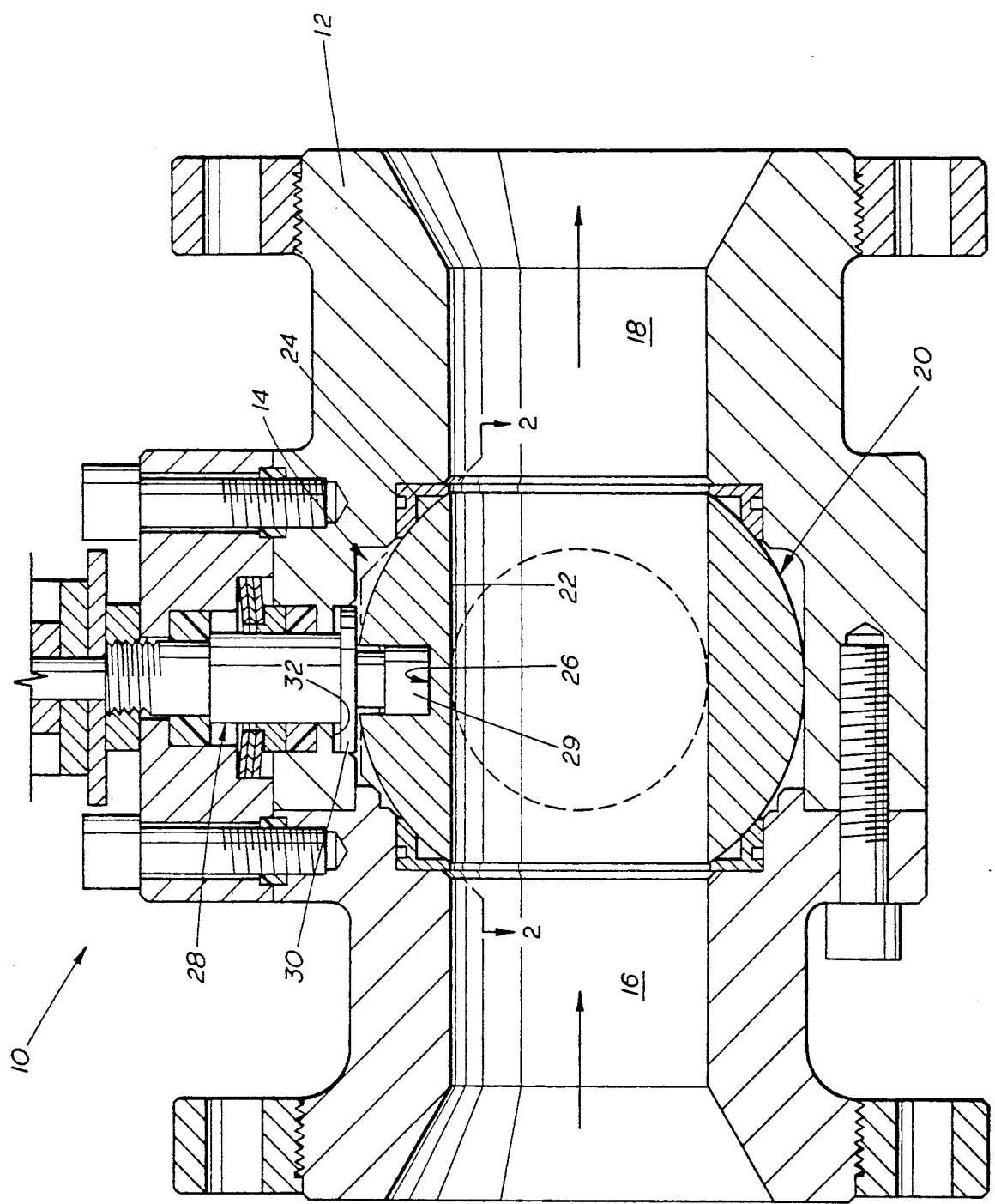
FIG. 1 is a cross section of a ball valve in accordance with the present invention in which the inner end of a drive stem is received within a slot in a floating ball member for rotating the ball member between open and closed positions with the stem spaced from the outer spherical surface of the ball member.
Figure 1A:
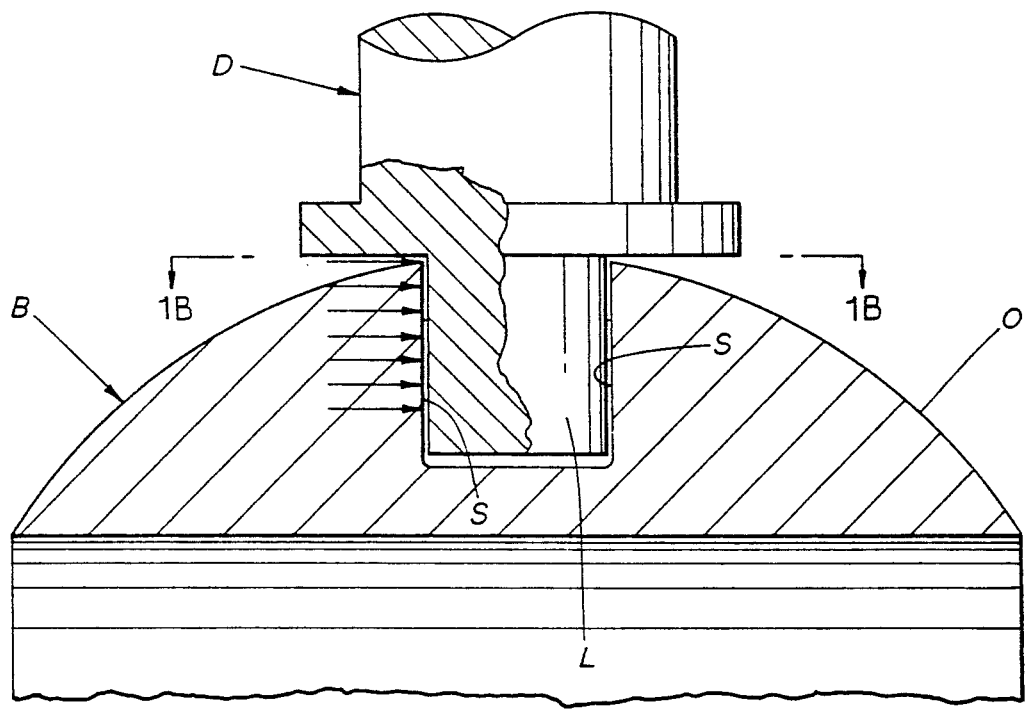
FIG. 1A is an enlarged partial section of a prior art ball valve in which the lower uniform thickness end of a drive stem is received within a slot in the ball member and contacts the ball member along a contact area extending to the outer spherical surface of the ball member to provide high stress concentrations thereat.

Referring particularly to FIGS. 1A and 1B in which a prior art ball valve is illustrated, a ball member B has an outer spherical surface O and an elongate slot therein defining opposed flat or planar surfaces S. Upon rotation of drive stem D which has an inner lug L of uniform dimensions in a counterclockwise direction as shown by arcuate arrows in FIG. 1B, high stress concentrations are obtained along contact lines or opposite corner areas C extending to the outer spherical surface O of ball member B. Cracking or fracture, particularly if ball member B is formed of a ceramic material oftentimes occurs adjacent outer spherical surface O of ball member B. If the ball member B is rotated in a clockwise direction as viewed in FIG. 1B, high stress concentrations are obtained at opposed corner contact areas indicated in broken lines at C.

DESCRIPTION OF THE INVENTION

Referring now particularly to FIG. 1, a ball valve is indicated generally at 10 including a valve body 12 having a valve chamber 14 therein in fluid communication with upstream and downstream flow passages 16 and 18. A floating ball valve member indicated generally at 20 is mounted in valve chamber 14 for rotation between open and closed positions. Floating ball valve member 20 has a central bore 22 therethrough for alignment with passages 16 and 18 in open position and has an outer spherical surface 24. An elongate slot generally indicated at 26 forms a keyway.

A stem generally indicated at 28 has a lower lug or key 29 received within slot 26. Stem 28 may be rotated manually or automatically such as by electrical or mechanical drive means (not shown). An annular flange 30 on stem 28 is adapted to contact shoulder 32 upon outward movement of stem 28 thereby to provide a stop to prevent blowout or separation of stem 28 from valve body 12.

Elongate slot 26 defines a pair of parallel planar sides 34 and 36 connected by a bottom or bottom surface 38. As shown in FIG. 2, slot 26 is closed at its ends by arcuate end surfaces 40. It may be desirable in some instances to form slot 26 with open ends extending through the body of ball member 20 and communicating with bore 22.

Lug or key 29 on the lower end of stem 28 has a pair of opposed outer parallel planar surfaces 42 and 44 connected by arcuate end surfaces 46 at corners 48 and 50. Key or lug 29 fits loosely within keyway or groove 26 with surfaces 42 and 44 being spaced from opposed surfaces 34 and 36 around 0.003 inch for a ball valve member 20 having a flow passage therethrough of a diameter of 2 inches, for example. As indicated in FIG. 2, upon a rotative action T applied by rotation of stem 28 in a counterclockwise position as viewed in FIG. 2, opposed corners 48 of stem 28 engage opposed surfaces 34 and 36 generally along line contact areas which are resisted by forces R from ball member 20 as shown by the arrows in solid lines in FIG. 2. Upon rotation of ball valve member 20 in an opposite clockwise position as viewed in FIG. 2, opposite corners 50 engage surfaces 34 and 36 along line contact areas and resisted by forces R as indicated in broken lines. Thus, stress concentrations are provided along the contact areas adjacent corners 48 and 50 upon rotation of ball valve member 20 between open and closed positions.

Figure 5:
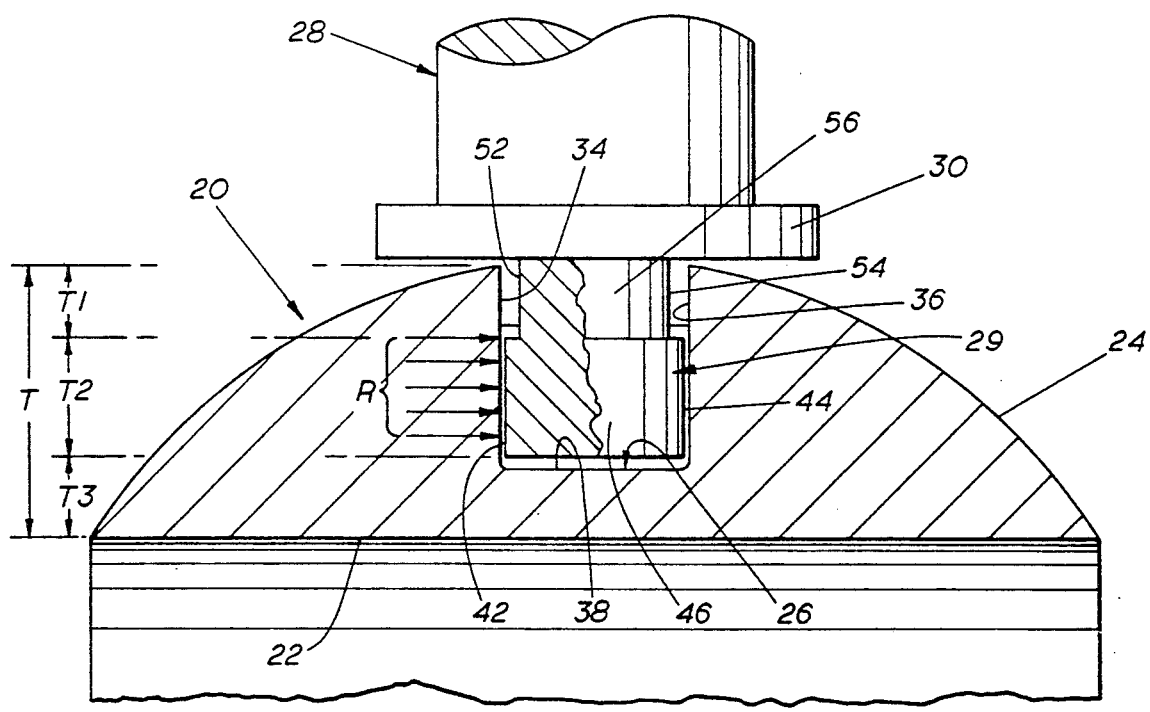
FIG. 5 is an enlarged sectional view taken generally along line 5—5 of FIG. 2 showing the contacting areas of the stem being spaced from the outer spherical surface of the ball member.

Recessed or cutaway surfaces 52, 54 of stem 28 below flange 30 are connected by recessed arcuate end surfaces 56 and are positioned between lug 44 and annular flange 30. As a result, the contact areas illustrated by resistance forces R do not extend to the outer spherical surface 24 of ball valve member 20 and the areas of the ball valve member 20 thereat are not subjected to high stress concentrations thereby minimizing any cracking or fracture of the ball valve member 20 from the torque exerted by stem 28. When ball valve members 20 are formed of a ceramic material, the ceramic materials are subjected to fracture when high stress concentrations are provided particularly adjacent the slot or opening receiving the stem at the outer spherical surface. The total thickness of ball member 20 between bore 22 and outer spherical surface 24 at the center of slot 26 is shown at T in FIG. 5. The contact areas of lug 29 should be spaced at least around 1/16 inch from outer spherical surface 24 of ball valve member 20 as shown at T1 in FIG. 5 and preferably should contact ball valve member within the middle 50% of total thickness T between bore 22 and outer spherical surface 24 as shown at T2. Under optimum conditions, T2 should be the middle 50% of T with T1 and T3 being around 20% to 25% of T. As an example, with ball member 20 having a bore diameter of 5 inches, T is around 1.55 inches, T1 is 0.35 inch, T2 is 0.50 inch and T3 is 0.70 inch. Under certain conditions, it is believed that T1 may be as small as 10% of T and yet function adequately for ball member 20 formed of a ceramic material.

Thus, the present invention is particularly adapted for use with ball valve members formed of a ceramic material. The present invention moves the load transfer point of loads transferred between the stem and ball valve member so that the load transfer area is deep in the slot instead of adjacent the outer spherical surface of the ball valve member. As a result of the present invention, the torsional capability of stems and ball valve members has been substantially increased and for ceramic ball valve members the torsional capability has been increased as high as around twice the torsional capability heretofore.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a ball valve having a valve body including a valve chamber, opposed inlet and outlet flow passages communicating with the valve chamber, and a ball member with an outer spherical surface member in said valve chamber mounted for rotation between open and closed positions relative to said flow passages;

a keyway in said ball member defining at least a pair of inner planar side surfaces;

a stem extending through said body having a key on its inner end received within said keyway and having an outer end extending outwardly of said body, said key having at least a pair of planar outer surfaces positioned in opposed relation to said inner side surfaces of said keyway;

means operatively connected to said outer end of said stem permitting the application of a rotative force to said stem to effect rotation of said spherical ball member between open and closed position upon force transmitting contact between said planar outer surfaces of said key and said planar inner surfaces of said keyway to provide a torque contact loading against said inner side surfaces defining said keyway; and cutaway surface portions between said planar surfaces of said key and said planar surfaces of said keyway adjacent said outer spherical surface of said ball member to provide a predetermined non-contacting area between said planar surfaces of said key and keyway to reduce the stress concentrations thereat for minmizing possible fracture of said ball member adjacent said outer spherical surface at said keyway.

2. In a ball valve as set forth in claim 1 wherein said ball member comprises a floating ball member mounted in said valve chamber.

3. In a ball valve as set forth in claim 2 wherein said keyway in said ball member comprises a longitudinally extending elongate slot and said key on said stem comprises an elongate lug received within said slot.

4. In a ball valve as set forth in claim 3 wherein said cutaway surface portions comprises recessed portions on said lug adjacent the outer spherical surface of said ball member.

5. In a ball valve as set forth in claim 1 wherein said pedetermined non-contacting area extends for at least 1/16 inch from the outer spherical surface of said ball member.

6. In a ball valve as set forth in claim 1 wherein said ball member has a central bore therethrough and said force transmitting contact is spaced from the outer spherical surface of said ball member at least 10% of the total thickness of said ball member between the outermost extent of said bore and the spherical surface of said ball member at the center of said keyway.

* * * * *